(12) United States Patent
Murota et al.

(10) Patent No.: US 9,550,298 B2
(45) Date of Patent: Jan. 24, 2017

(54) COVERING MATERIAL AND COVERING STRUCTURE FOR ROBOT GRASPING UNIT

(71) Applicant: NOK Corporation, Tokyo (JP)

(72) Inventors: Yuki Murota, Kanagawa (JP); Takeshi Yamada, Kanagawa (JP)

(73) Assignee: NOK Corporation, Tokyo (JP)

(*) Notice: Subject to any disclaimer, the term of this patent is extended or adjusted under 35 U.S.C. 154(b) by 0 days.

(21) Appl. No.: 15/034,737

(22) PCT Filed: Nov. 25, 2014

(86) PCT No.: PCT/JP2014/081080
§ 371 (c)(1),
(2) Date: May 5, 2016

(87) PCT Pub. No.: WO2015/087696
PCT Pub. Date: Jun. 18, 2015

(65) Prior Publication Data
US 2016/0279805 A1    Sep. 29, 2016

(30) Foreign Application Priority Data

Dec. 10, 2013  (JP) .................................. 2013-255069
Jun. 13, 2014  (JP) .................................. 2014-122770

(51) Int. Cl.
*B25J 15/08*   (2006.01)
*B25J 15/00*   (2006.01)

(52) U.S. Cl.
CPC .......... *B25J 15/0033* (2013.01); *B25J 15/008* (2013.01)

(58) Field of Classification Search
USPC ...... 294/86.4, 99.1, 212, 213, 902; 269/266, 269/270, 286; 901/31, 39
See application file for complete search history.

(56) References Cited

U.S. PATENT DOCUMENTS 1,606,898 A * 11/1926 Robinson ................ B66C 1/442
                                                    294/86.4
2,819,113 A *  1/1958 Phillips .................. B66F 9/183
                                                    294/99.1
(Continued)

FOREIGN PATENT DOCUMENTS

JP    8300289    11/1996
JP    4918004     2/2012
JP    4962728     4/2012

*Primary Examiner* — Paul T Chin
(74) *Attorney, Agent, or Firm* — K. David Crockett, Esq.; Paul J. Backofen, Esq.; Crockett & Crockett, PC

(57) ABSTRACT

An object is to provide a covering material and a covering structure of a robot gripping portion capable of providing proper gripping performance depending on various objects to be gripped so as to grip the objects and is solved by a covering material disposed on a surface of a base material 11 having a function of gripping an object, including an inner layer 121 made up of an elastic body and an outer layer 122 made up of an elastic body coming into contact with the object when gripping the object on a surface of the inner layer 121, the inner layer 121 being made up of the elastic body having a tackiness and having a hardness lower than the outer layer 122, the outer layer 122 having one or more penetrating portions 13 penetrating to the inner layer 121 such that when a stress acts at the time of gripping of the object, a portion of the inner layer 122 enters the penetrating portion 13 or protrudes from the penetrating portion 13 depending on a magnitude of the stress.

12 Claims, 12 Drawing Sheets

(56) References Cited

U.S. PATENT DOCUMENTS

| | | | | |
|---|---|---|---|---|
| 3,778,094 A * | 12/1973 | Grolet | ................... | B65G 37/00 |
| | | | | 294/902 |
| 4,093,296 A * | 6/1978 | Itoh | ....................... | B65G 47/90 |
| | | | | 294/115 |
| 4,367,891 A * | 1/1983 | Wauer | ................. | B25J 15/0009 |
| | | | | 269/266 |
| 4,828,304 A * | 5/1989 | No | ....................... | B25J 15/0616 |
| | | | | 294/106 |
| 5,470,116 A * | 11/1995 | DeWoskin | ............... | B65H 3/20 |
| | | | | 294/212 |
| 8,454,070 B2 * | 6/2013 | Bierfreund | ........... | F41B 5/1465 |
| | | | | 294/217 |
| 9,067,324 B2 * | 6/2015 | Matsuoka | ............ | B25J 15/0023 |
| 2007/0018470 A1 * | 1/2007 | Hayakawa | ............ | B25J 9/0009 |
| | | | | 294/106 |

\* cited by examiner

COVERING MATERIAL AND COVERING STRUCTURE FOR ROBOT GRASPING UNIT

FIELD OF THE INVENTION

The present invention relates to a covering material and a covering structure of a robot gripping portion and, more particularly, to a covering material and a covering structure of a robot gripping portion capable of providing proper gripping performance depending on various objects to be gripped so as to grip the objects.

BACKGROUND OF THE INVENTIONS

Industrial robots have hitherto been introduced into production lines of factories, contributing to improvement in production efficiency. The industrial robots are excellent in the function of gripping objects such as parts and articles conveyed in one line and transferring the objects to another line accurately any number of times.

To grip the objects, air-chuck and multi-fingered robot hands are used in the industrial robots.

The objects to be gripped by such a robot hand include various objects such as heavy objects, light objects, large objects, small objects, minute objects, hard materials, soft materials, fragile objects, rigid objects, or mixed or variable objects thereof. Therefore, many materials, shapes, dimensions, properties etc. are devised for a surface of a robot gripping portion of a robot hand, which significantly affects the gripping performance.

For example, it is proposed to fabricate the robot gripping portion from a soft material such as rubber and resin, and control an operation by mounting a sensing component such as a sensor (Patent Document 1), to dispose a material having a large friction coefficient on a surface or make the surface uneven (Patent Document 2), to cover a surface with an elastic material (Patent Document 3), etc., and measures are taken to enhance the gripping performance from material, physical, and chemical viewpoints.

Therefore, if a type of objects to be gripped is fixed as in the case of an industrial robot hand used in an assembling production line or a robot hand performing only a certain operation, the gripping performance can be improved by taking measures for optimizing a material etc. depending on the objects to optimize the tackiness and the friction coefficient of the gripping portion surface.

PATENT DOCUMENTS

Patent Document 1: JP-A-8-300289;
Patent Document 2: JP-B-4962728;
Patent Document 3: JP-B-4918004.

SUMMARY

However, in the case of robot hands of partner robots, nursing-care robots, etc. without a fixed type of operations or robot hands for industrial use or space use not limited to a certain operation, an object to be gripped is not specified and, therefore, it is difficult to take a measure to optimize the tackiness and the friction coefficient of the gripping portion surface for improvement in the gripping performance of the robot gripping portion.

For example, if an object to be gripped is a heavy object, the surface of the robot gripping portion may be given a relatively large tackiness or friction coefficient depending on the weight thereof so that the robot gripping portion can support the weight of the object. However, if the robot gripping portion having the relatively large tackiness or friction coefficient grips a light object, the light object may stick to the surface of the robot gripping portion at the time of release, which may significantly degrade the workability.

Conversely, if the surface of the robot gripping portion is given a relatively small tackiness or friction coefficient so as to grip a light object and a heavy object is gripped, the heavy object may be slipped.

This leads to a problem that the requirements for gripping widely differ depending on an object to be gripped and therefore cannot be met by only selecting a surface material quality.

Moreover, when a gripped object is released, it is desirable that the object is easily released.

It is therefore an object of the present invention to provide a covering material and a covering structure of a robot gripping portion capable of providing proper gripping performance depending on various objects to be gripped so as to grip the objects.

It is also an object of the present invention to provide a covering material and a covering structure of a robot gripping portion capable of providing proper gripping performance depending on various objects to be gripped so as to grip the objects and capable of easily releasing a gripped object.

Other objects of the present invention will become apparent from the following description.

Means for Solving Problem

The objects are achieved by the following aspects of the invention.

1. A covering material disposed on a surface of a base material having a function of gripping an object, comprising:
    an inner layer made up of an elastic body; and an outer layer on a surface of the inner layer, made up of an elastic body coming into contact with the object when gripping the object,
    the inner layer being made up of the elastic body having a tackiness and having a hardness lower than the outer layer,
    the outer layer having one or more penetrating portions penetrating to the inner layer such that when a stress acts at the time of gripping of the object, a portion of the inner layer enters the penetrating portion or protrudes from the penetrating portion depending on a magnitude of the stress.

2. The covering material of claim 1, wherein the outer layer is configured such that when the stress is relaxed and the portion of the inner layer retracts in the penetrating portion, the inside of the penetrating portion communicates with external fluid to prevent pressure from being reduced in the penetrating portion.

3. The covering material of claim 2, wherein in the surface of the outer layer, the penetrating portion extends to the outside of a gripping site gripping the object so that the penetrating portion itself forms a flow channel allowing the inside of the penetrating portion to communicate with the external fluid.

4. The covering material of claim 2 or 3, wherein the surface of the outer layer is disposed with a groove connecting to the penetrating portion and having a depth within a range not reaching the inner layer, and wherein the groove extends to the outside of the gripping site gripping the object so that the groove forms a flow channel allowing the inside of the penetrating portion to communicate with the external fluid.

5. The covering material of any one of claims 1 to 4, wherein the hardness of the elastic body of the inner layer is Shore A hardness of 0 to 40 degrees, and wherein the hardness of the elastic body of the outer layer is Shore A hardness of 40 to 90 degrees.

6. The covering material of any one of claims 1 to 5, wherein the elastic body used for the inner layer is a silicone gel or a urethane gel, and wherein the elastic body used for the outer layer is a silicone rubber or a urethane rubber.

7. A covering structure of a robot gripping portion comprising on a surface of the robot gripping portion having a function of gripping an object:
   an inner layer made up of an elastic body; and an outer layer on a surface of the inner layer, made up of an elastic body coming into contact with the object when gripping the object,
   the inner layer being made up of the elastic body having a tackiness and having a hardness lower than the outer layer,
   the outer layer having one or more penetrating portions penetrating to the inner layer such that when a stress acts at the time of gripping of the object, a portion of the inner layer enters the penetrating portion or protrudes from the penetrating portion depending on a magnitude of the stress.

8. The covering structure of a robot gripping portion of claim 7, wherein the outer layer is configured such that when the stress is relaxed and the portion of the inner layer retracts in the penetrating portion, the inside of the penetrating portion communicates with external fluid to prevent pressure from being reduced in the penetrating portion.

9. The covering structure of a robot gripping portion of claim 8, wherein in the surface of the outer layer, the penetrating portion extends to the outside of a gripping site gripping the object so that the penetrating portion itself forms a flow channel allowing the inside of the penetrating portion to communicate with the external fluid.

10. The covering structure of a robot gripping portion of claim 8 or 9, wherein the surface of the outer layer is disposed with a groove connecting to the penetrating portion and having a depth within a range not reaching the inner layer, and wherein the groove extends to the outside of the gripping site gripping the object so that the groove forms a flow channel allowing the inside of the penetrating portion to communicate with the external fluid.

11. The covering structure of a robot gripping portion of any one of claims 7 to 10, wherein the hardness of the elastic body of the inner layer is Shore A hardness of 0 to 40 degrees, and wherein the hardness of the elastic body of the outer layer is Shore A hardness of 40 to 90 degrees.

12. The covering structure of a robot gripping portion of any one of claims 7 to 11, wherein the elastic body used for the inner layer is a silicone gel or a urethane gel, and wherein the elastic body used for the outer layer is a silicone rubber or a urethane rubber.

Effect of the Invention

The present invention can provide the covering material and the covering structure of a robot gripping portion capable of providing proper gripping performance depending on various objects to be gripped so as to grip the objects. The present invention can provide the covering material and the covering structure of a robot gripping portion capable of providing proper gripping performance depending on various objects to be gripped so as to grip the objects and capable of easily releasing a gripped object.

DETAILED DESCRIPTION OF THE INVENTIONS

An embodiment of the present invention will now be described.

A covering material of the present invention is applicable to various covering materials having the problems in common with the present invention and is particularly preferably applicable to a robot gripping portion gripping an object in an air-chuck or multi-fingered robot hand.

Figure 1:
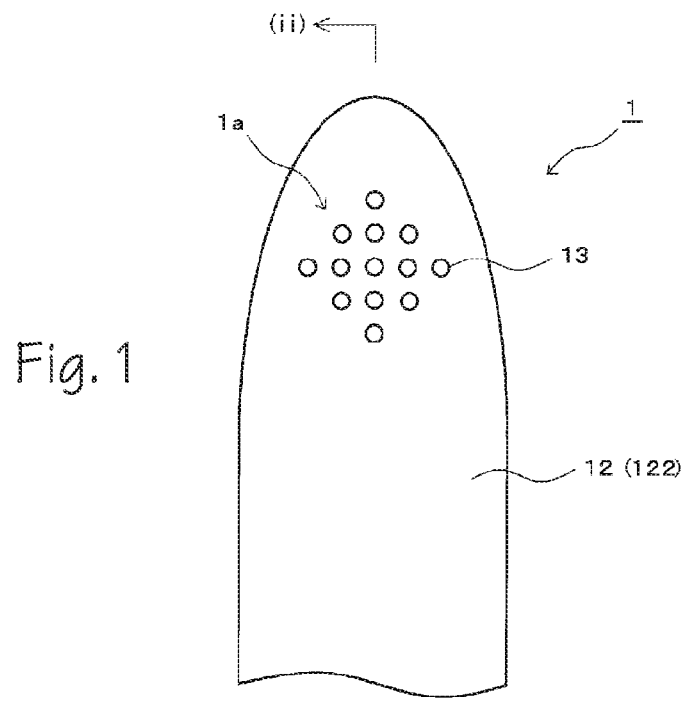
FIG. 1 is a front view of an example of a covering structure of a robot gripping portion using a covering material of the present invention in a robot hand.
Figure 2:
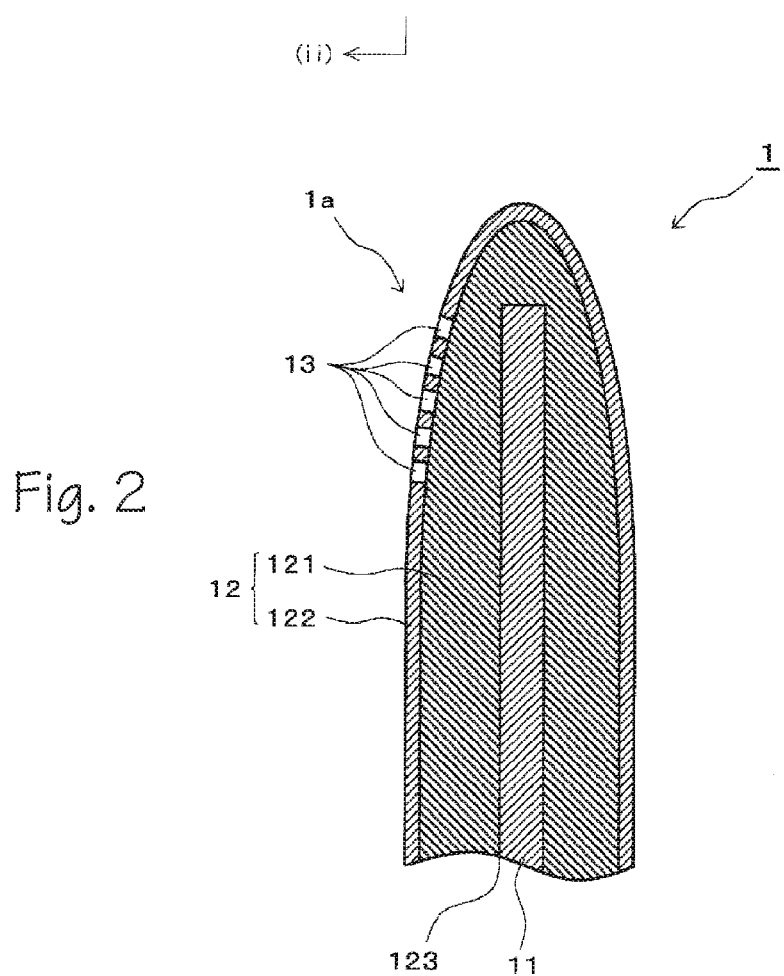
FIG. 2 is a cross-sectional view taken along a line (ii)-(ii) of FIG. 1.

FIG. 1 is a front view of an example of a covering structure of a robot gripping portion to which the covering material of the present invention is applied in a robot hand, and FIG. 2 is a cross-sectional view taken along a line (ii)-(ii) of FIG. 1.

In the figures, 1 denotes one robot gripping portion gripping an object in a robot hand and the robot gripping portion 1 includes a base material 11 acting as a core material and a covering material 12 covering a surface of the base material 11.

The robot gripping portion 1 exhibits a desired gripping function through a robot drive mechanism not depicted.

The robot gripping portion 1 may be formed by integrally forming the covering material 12 on the surface of the base material 11 or may be formed by putting and fixedly attaching onto the base material 11 the covering material 12 formed separately from the base material 11. This embodiment represents the latter form of the robot gripping portion 1 constructed by putting and fixedly attaching onto the base material 11 the covering material 12 formed separately from the base material 11. A means of fixedly attaching the covering material 12 to the base material 11 is not particularly limited and may be, for example, a means using application of an adhesive or a tack agent or a means using a double-sided tape.

The covering material 12 has an inner layer 121 disposed on a surface of the base material 11 and an outer layer 122 disposed in contact with a surface of the inner layer 121. In a substantially center portion of the inner layer 121, a deep groove-shaped mounting portion 123 is formed to insert the base material 11 for mounting on the base material 11. When the robot gripping portion 1 grips an object, the outer layer 122 is a layer directly contacting the object.

Both the inner layer 121 and the outer layer 122 are made up of an elastic body. In the present invention, the elastic body making up the inner layer 121 is made up of an elastic body having a tackiness and having a hardness lower than the elastic body making up the outer layer 122. The tackiness of the inner layer 121 described in this embodiment is higher than the tackiness of the elastic body making up the outer layer 122. Therefore, the elastic body making up the outer layer 122 generally has a larger crosslinking density, a lower tackiness, and a higher hardness than the elastic body making up the inner layer 121.

The outer layer 122 has circular hole-shaped penetrating portions 13 formed in a gripping site 1a that is a site coming into contact with an object when gripping the object (in other words, a region of contact with the object). The penetrating portions 13 penetrate the outer layer 122 from the surface of the outer layer 122 to the inner layer 121. Therefore, when the gripping site 1a of the robot gripping portion 1 is observed from the outside, the inner layer 121 can be confirmed by sight in the penetrating portions 13. However, during normal time without gripping an object, the inner layer 121 is located at a boundary portion between the inner layer 121 and the outer layer 122 and does not enter the penetrating portions 13.

Although a plurality of the penetrating portions 13 is formed and vertically and horizontally arranged in the figures, the number of the penetrating portions 13 is not particularly limited and the one or more penetrating portions 13 may be formed in the outer layer 122. The arrangement configuration of the penetrating portions 13 is not particularly limited.

An action of gripping an object to be gripped with the robot gripping portion 1 including the covering material 12 configured in this way will be described with reference to FIGS. 3 to 8.

Figure 3:
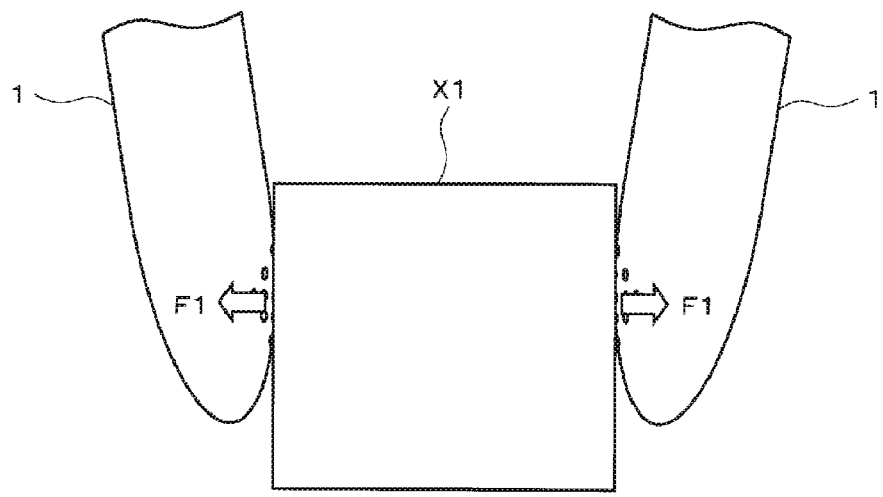
FIG. 3 is an explanatory view for explaining how the robot gripping portion grips an object X1 that is a light object.

FIG. 3 depicts the case of the object to be gripped that is a relatively light object X1. When the robot gripping portion 1 grips the object X1 with a predetermined gripping force, the object X1 contacts the surface (the outer layer 122) of the gripping site 1a of the covering material 12, and therefore, a gripping stress F1 acts on the surface of the gripping site 1a. The gripping stress may be a force applied as a reaction to the gripping force of gripping an object (in other words, a force of pressing the object). As a result, both the inner layer 121 and the outer layer 122 of the covering material 12 elastically deform depending on the magnitude of the gripping stress F1. The gripping stress F1 in this case is a relatively small force to the extent that a light object may be gripped. This gripping stress F1 causes a stress to act on the inner layer 121 and the outer layer 122 such that the layers are pinched between the object X1 and the base material 11.

Since the inner layer 121 has the hardness lower than the outer layer 122, the inner layer 121 elastically deforms in a squashed manner depending on the magnitude of the gripping stress F1 acting on the surface of the gripping site 1a and a portion 121a of the inner layer 121 moves to enter the penetrating portions 13.

Figure 4:
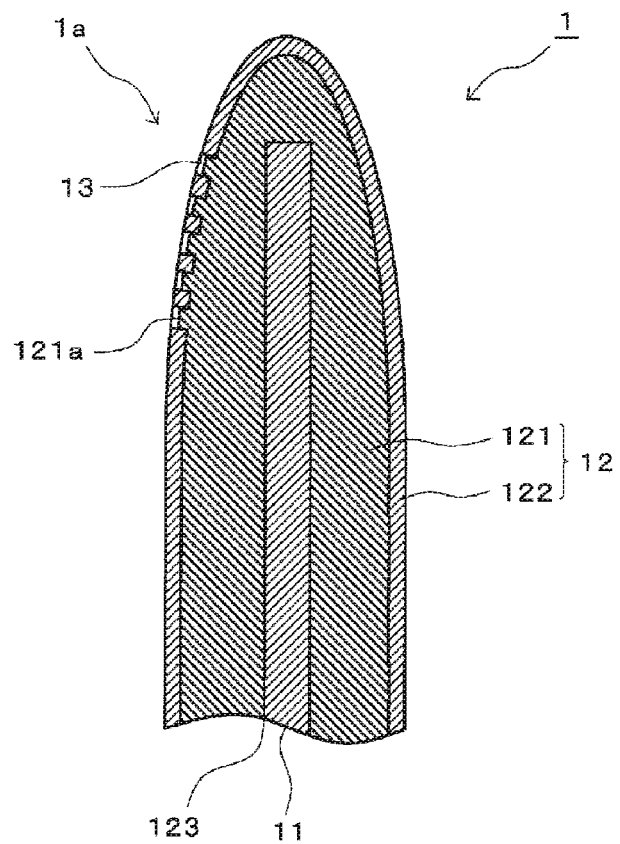
FIG. 4 is a cross-sectional explanatory view taken along a line (ii)-(ii) of FIG. 1 for explaining an action of the robot gripping portion when gripping a light object.
Figure 5:
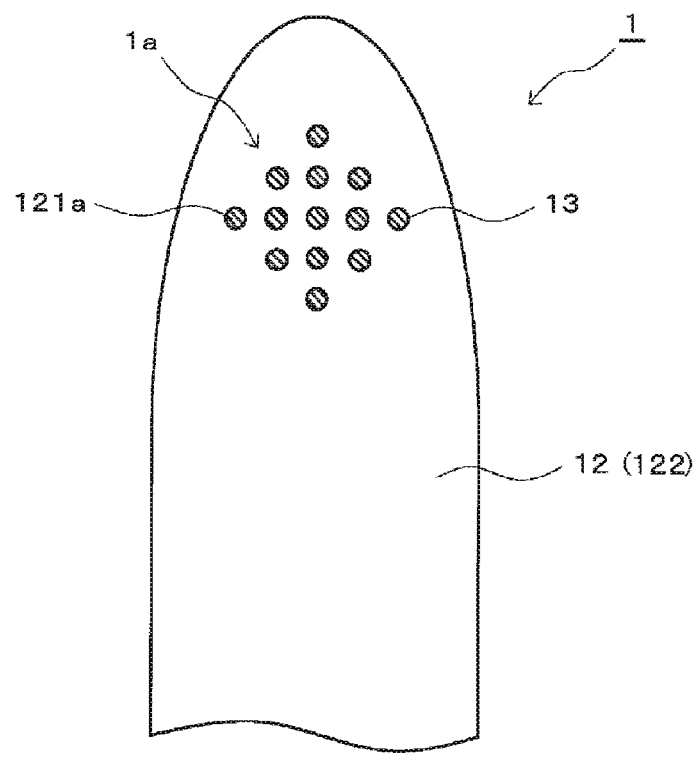
FIG. 5 is a front explanatory view for explaining an action of the robot gripping portion when gripping a light object.

However, the gripping stress F1 acting on the surface of the gripping site 1a is relatively small in this case. Therefore, the stress acting on the inner layer 121 and the outer layer 122 is small and the portion 121a of the inner layer 121 moving into the penetrating portions 13 due to the stress is small in amount. Therefore, even when the portion 121a of the inner layer 121 enters the inside of the penetrating portions 13, the portion 121a stays inside the penetrating portions 13 as depicted in FIGS. 4 and 5 and does not protrude to the surface of the outer layer 122.

Therefore, at the time of gripping of the object X1 that is a light object, only the surface of the outer layer 122 having the tackiness lower than the inner layer 121 contacts the object X1. Therefore, the robot gripping portion 1 can grip the object X1 in a proper gripping state without strong tack of the surface of the covering material 12 to the object X1. It is noted that the object X1 is not depicted in FIGS. 4 and 5.

Figure 6:
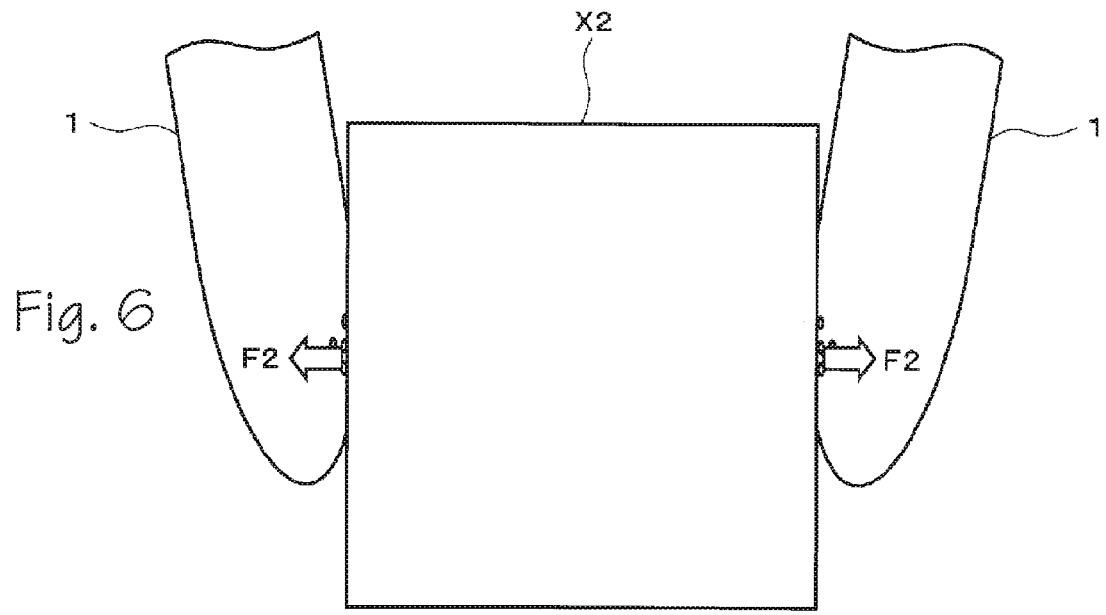
FIG. 6 is an explanatory view for explaining how the robot gripping portion grips an object X2 that is a heavy object.

On the other hand, FIG. 6 depicts the case of the object to be gripped that is a relatively heavy object X2. When the robot gripping portion 1 grips the object X2 with a predetermined gripping force, the object X2 contacts the surface (the outer layer 122) of the gripping site 1a of the covering material 12 and, therefore, a gripping stress F2 acts on the surface of the gripping site 1a. As a result, both the inner layer 121 and the outer layer 122 of the covering material 12 elastically deform depending on the magnitude of the gripping stress F2. The gripping stress F2 in this case is a relatively large force with which a heavy object may sufficiently be gripped. This gripping stress F2 causes a stress to act on the inner layer 121 and the outer layer 122 such that the layers are pinched between the object X2 and the base material 11.

In this case, a larger stress acts on the inner layer 121 and the outer layer 122 as compared to when the object X1 is gripped, and the inner layer 121 elastically deforms in a squashed manner depending on the magnitude of the stress. As a result, the portion 121a of the inner layer 121 moves to enter the penetrating portions 13 in a larger amount as compared to when the object X1 is gripped.

Figure 7:
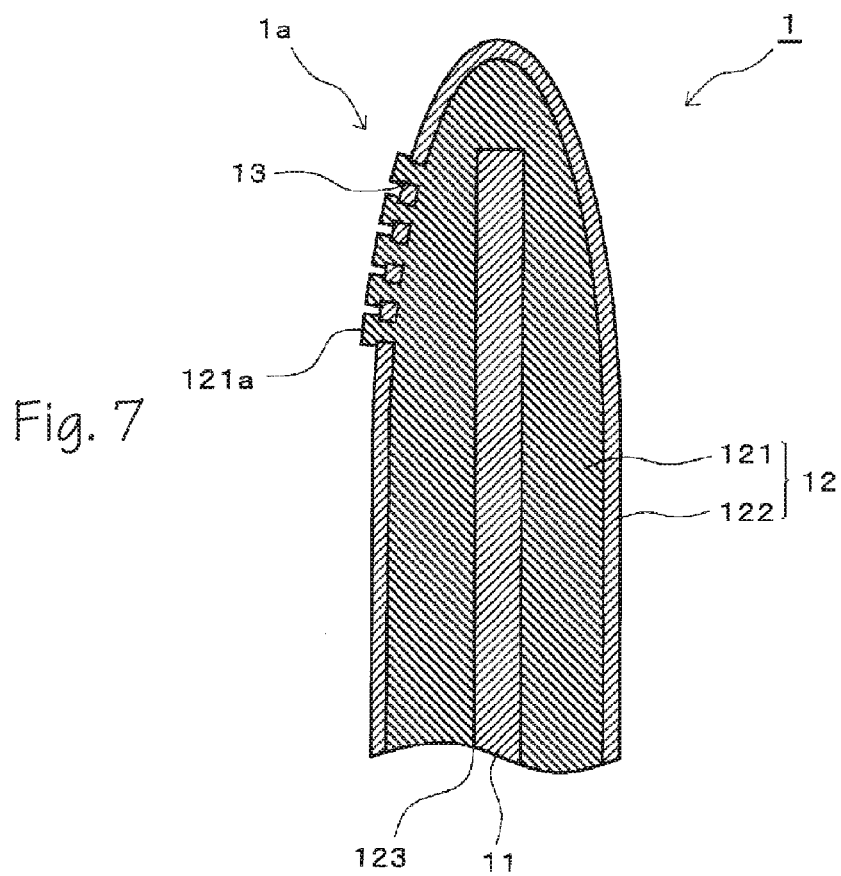
FIG. 7 is a cross-sectional explanatory view taken along a line (ii)-(ii) of FIG. 1 for explaining an action of the robot gripping portion when gripping a heavy object.
Figure 8:
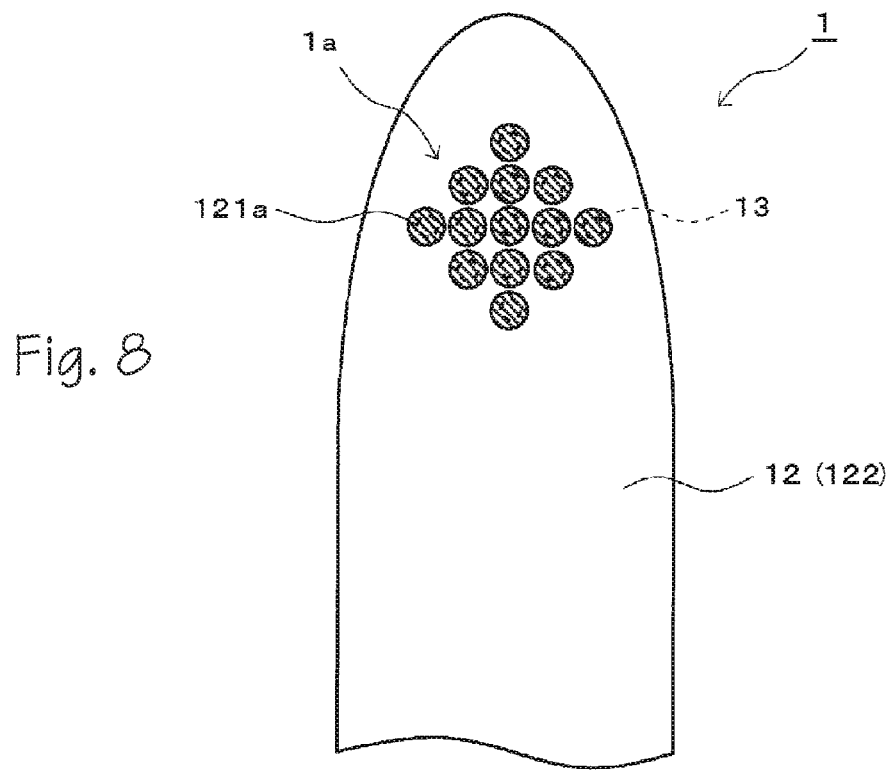
FIG. 8 is a front explanatory view for explaining an action of the robot gripping portion when gripping a heavy object.

The gripping stress F2 in this case is larger than the gripping stress F1 at the time of gripping of the object X1. Therefore, the portion 121a of the inner layer 121 moving to enter the penetrating portions 13 reaches the surface of the outer layer 122 from the penetrating portions 13 and further attempts to largely protrude from the penetrating portions 13 depending on the magnitude of the gripping stress F2 as depicted in FIGS. 7 and 8. The portion 121a of the inner layer 121 reaching the surface of the penetrating portions 13 or protruding from the penetrating portions 13 contacts the object X2.

Therefore, at the time of gripping of the object X2 that is a heavy object, not only the surface of the outer layer 122 but also the portion 121a of the inner layer 121 having the tackiness higher than the outer layer 122 can be brought into direct contact with the object X2 through the penetrating portions 13 disposed in the outer layer 122. Thus, the object X2 can be gripped in a proper gripping state without slipping the gripped object X2. It is noted that the object X2 is not depicted in FIGS. 7 and 8.

As described above, the covering material 12 and the covering structure of the robot gripping portion 1 including the covering material 12 according to the present invention can provide proper gripping performance depending on various objects to be gripped so as to grip the objects.

For the convenience of description, FIG. 7 depicts the portion 121a of the inner layer 121 largely protruding from the penetrating portions 13. However, when the object X2 is actually gripped, the portion 121a of the inner layer 121 contacts the object X2 and is thereby prevented from further protruding. Therefore, it can easily understood that, depending on the weight of the object X2 (the magnitude of the gripping stress F2), the portion 121a of the inner layer 121 causes a stronger tackiness to act on the object X2 or deforms to spread between the object X2 and the surface of the outer layer 122 so as to change the tackiness and the friction coefficient of the surface of the covering material 12 and the contact area with the portion 121a of the inner layer.

Figure 9:
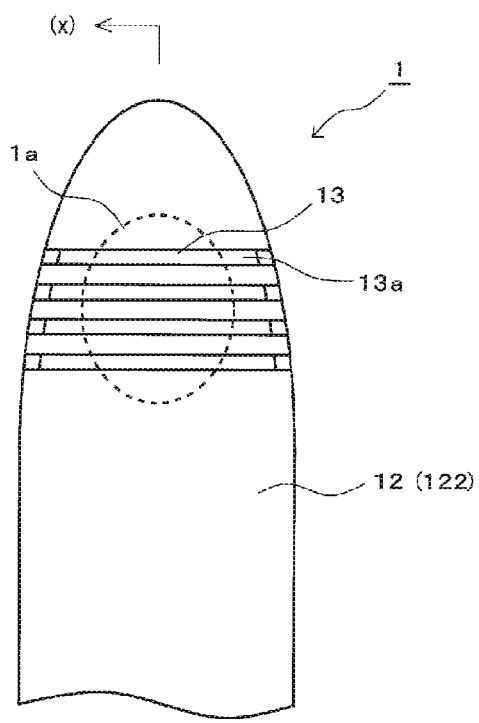
FIG. 9 is a front view of another example of the covering structure of the robot gripping portion using the covering material of the present invention in a robot hand.
Figure 10:
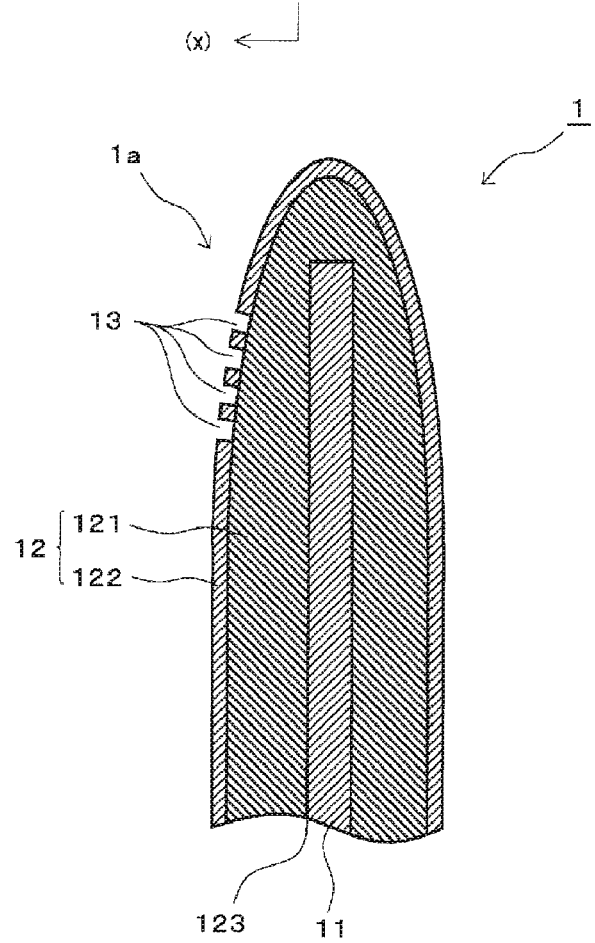
FIG. 10 is a cross-sectional view taken along a line (x)-(x) of FIG. 9.

FIG. 9 is a front view of another example of the covering structure of the robot gripping portion to which the covering material of the present invention is applied in a robot hand, and FIG. 10 is a cross-sectional view taken along a line (x)-(x) of FIG. 9. The portions having the same reference numerals as FIGS. 1 to 8 represents the portions having the same configurations. Therefore, constituent elements different from FIGS. 1 to 8 will be described below and the other constituent elements will not be described since the description of FIGS. 1 to 8 can be referenced.

The robot gripping portion 1 depicted in FIGS. 9 and 10 is in common with the robot gripping portion 1 depicted in FIGS. 1 to 8 in that the penetrating portions 13 are formed in the gripping site 1a of the outer layer 122 that is a site coming into contact with an object when gripping the object, and is different in that the penetrating portions 13 depicted in FIGS. 9 and 10 are formed as the slit-shaped penetrating portions 13. The slit-shaped penetrating portions 13 represent a preferable form formed to extend to the outside of the gripping site 1a indicated by a broken line. As a result, each of the penetrating portions 13 has an extended portion 13a extended to the outside of the gripping site 1a.

Although a plurality of the penetrating portions 13 is formed and arranged, the number of the penetrating portions 13 is not particularly limited and the one or more penetrating portions 13 may be formed in the outer layer 122. The arrangement configuration of the penetrating portions 13 is not particularly limited.

The robot gripping portion 1 including the slit-shaped penetrating portions 13 produces the effect that both a light object and a heavy object can be gripped in a proper gripping state exactly like the robot gripping portion 1 depicted in FIGS. 1 to 8.

In particular, at the time of gripping of the object X1 that is a light object, only the surface of the outer layer 122 having the tackiness lower than the inner layer 121 contacts the object X1 and the object X1 can be gripped in a proper gripping state without strong tack of the surface of the covering material 12 to the object X1. At the time of gripping of the object X2 that is a heavy object, not only the surface of the outer layer 122 but also a portion of the inner layer 121 having the tackiness higher than the outer layer 122 can be brought into direct contact with the object X2 through the penetrating portions 13 disposed in the outer layer 122. Therefore, the object X2 can be gripped in a proper gripping state without slipping the gripped object X2.

The slit-shaped penetrating portions 13 depicted in FIGS. 9 and 10 have the extended portions 13a extending to the outside of the gripping site 1a and therefore produce a remarkable effect described below when the gripped object is released.

Figure 11A:
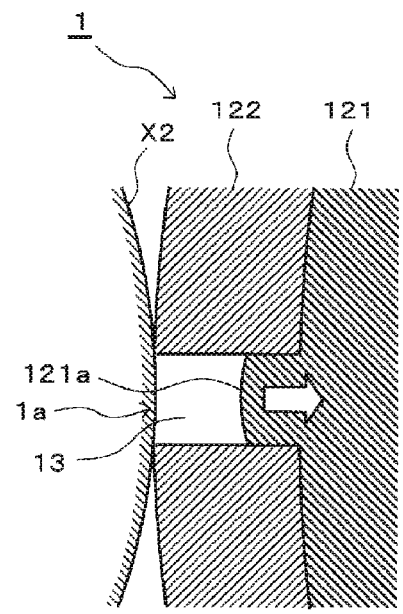
FIG. 11 is a cross-sectional explanatory view for explaining an action of the robot gripping portion when releasing the object gripped by the robot gripping portion depicted in FIGS. 9 and 10.
Figure 11B:
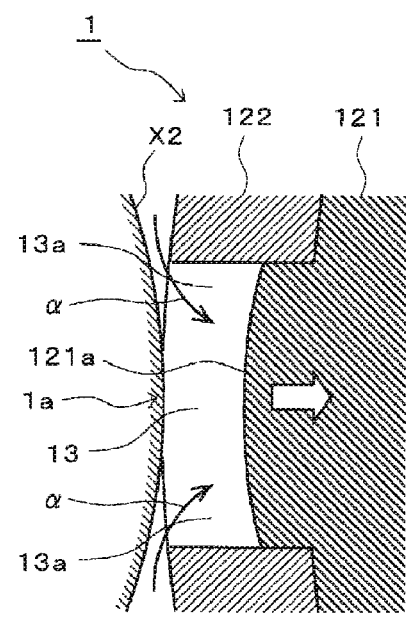

FIG. 11 is an enlarged cross-sectional view of a main part of the robot gripping portion 1 for explaining the action at the time of release of the object X2 from the gripped state of the object X2 that is a heavy object. FIG. 11(a) depicts the penetrating portion 13 without the extended portion 13a for comparison. FIG. 11(b) depicts the penetrating portion 13 having the extended portion 13a.

As depicted in FIGS. 11(a) and 11(b), when the gripped object X2 is released (i.e., separated from the surface of the gripping site 1a of the outer layer 122), the gripping stress is relaxed. Since the gripping stress is relaxed, the portion 121a of the inner layer 121 retracts in the penetrating portion 13 (white arrows in FIG. 11).

As depicted in FIG. 11(a), in the case of the robot gripping portion 1 with the penetrating portion 13 without the extended portion 13a, when the object X2 is gripped, the penetrating portion 13 is closed by the object X2 contacting the gripping site 1a and the inside of the penetrating portion 13 is isolated from the outside due to the contact with the object X2. Therefore, when the retraction of the portion 121a of the inner layer 121 occurs, pressure is reduced in the penetrating portion 13. This reduced pressure may induce a sucker action attempting to suck the object X2 to the surface (the outer layer 122) of the gripping site 1a. Although the object X2 is released by gravity etc. acting on the object X2 to cancel the sucker action, it is desirable to prevent the induction of the sucker action in terms of more reliable and more stable release of the object X2.

In contrast, as depicted in FIG. 11(b), in the case of the robot gripping portion 1 with the penetrating portion 13 having the extended portion 13a, even when the object X2 is gripped and the object X2 contacts the gripping site 1a, the inside of the penetrating portion 13 is not isolated from the outside because the extended portion 13a extends to the outside of the gripping site 1a. Therefore, when the gripping stress is relaxed and the portion 121a of the inner layer 121 retracts in the penetrating portion 13, the extended portion 13a communicates with external fluid so as to prevent the reduction in pressure in the penetrating portion 13.

The external fluid in this case is fluid surrounding the robot gripping portion 1 and the object X2 (in other words, fluid filling a space in which the robot gripping portion 1 is disposed) and has fluidity like gas and liquid. For example, when the robot gripping portion 1 is disposed in the air, the external fluid refers to the air and, when the robot gripping portion 1 is disposed in substitution atmosphere substituted by a gas such as nitrogen, the external fluid refers to the substitution gas.

As the portion 121*a* of the inner layer 121 retracts in the penetrating portion 13, the external fluid flows into the penetrating portion 13 through a flow channel a formed by the extended portion 13*a* and prevents the reduction in pressure in the penetrating portion 13 due to the retraction. As a result, when the object X2 is released, the object X2 is prevented from being sucked to the penetrating portion 13. Therefore, the effect is produced that enables easy release from the surface (the outer layer 122) of the gripping site 1*a* of the covering material 12.

Thus, the covering material 12 and the covering structure of the robot gripping portion 1 including the covering material 12 depicted in FIGS. 9 and 10 can prevent the sucker action described above to preferably release the object X2. In particular, when the object X2 is released, the problem of inability to release or of time required until release can preferably be improved to achieve more reliable and more stable release.

Although the case of releasing the object X2 is described above, the same applies to the case of releasing the object X1. When the relatively light object X1 is released, the portion 121*a* of the inner layer 121 may retract in the penetrating portion 13 to no small extent as the gripping stress is relaxed. The relatively light object X1 is easily sucked even by slightly reduced pressure. Therefore, even when pressure is slightly reduced by the retraction, the effect of sucking prevention is sufficiently produced by preventing the reduction in pressure. In other words, the effect of enabling easy release of an object is produced with high versatility.

Although the penetrating portion 13 itself extends to the outside to include the extended portion 13*a* as a flow channel allowing the inside of the penetrating portion 13 to communicate with the external fluid in the case described above, this form is not a limitation and the communication between the inside of the penetrating portion 13 and the external fluid may be achieved by a flow channel disposed separately from the penetrating portion 13.

This flow channel is not particularly limited as long as the flow channel allows the penetrating portion 13 to communicate with the external fluid when the gripping stress is relaxed and the portion 121*a* of the inner layer 121 retracts in the penetrating portion 13. A preferable example of such a flow channel can be a groove disposed in the surface of the outer layer 122. This will be described with reference to FIG. 12.

Figure 12:
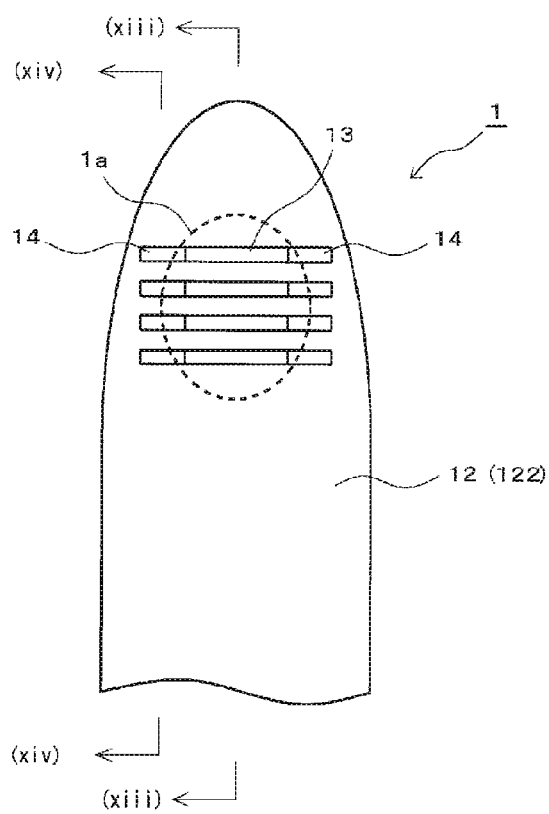
FIG. 12 is a front view of another embodiment of the robot gripping portion depicted in FIGS. 9 and 10.
Figure 13:
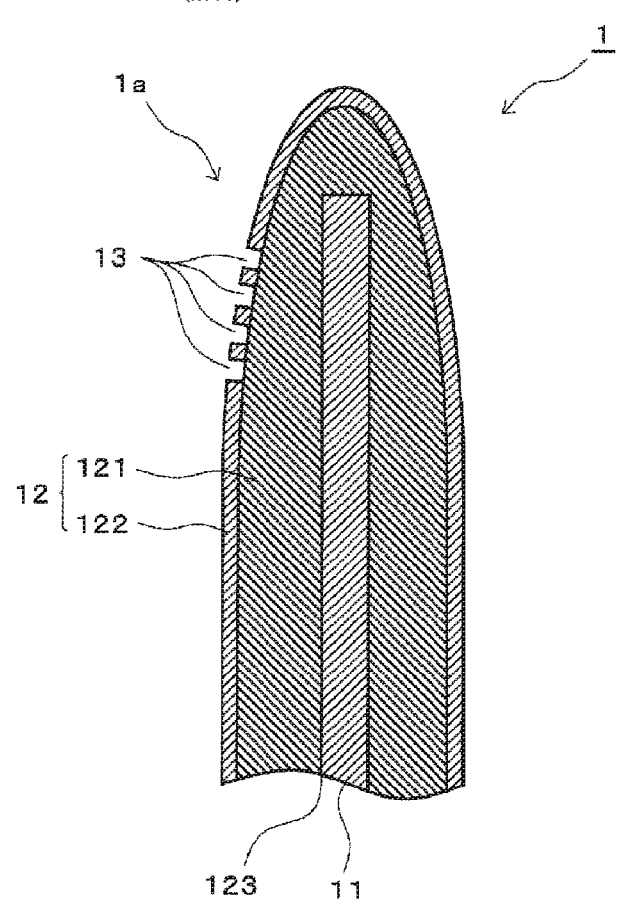
FIG. 13 is a cross-sectional view taken along a line (xiii)-(xiii) of FIG. 12.

FIG. 12 is a front view of an example of the robot gripping portion to which a covering material having a groove is applied; FIG. 13 is a cross-sectional view taken along a line (xiii)-(xiii) of FIG. 12; and FIG. 14 is a cross-sectional view taken along a line (xiv)-(xiv) of FIG. 12.

In the figures, reference numeral 14 denotes a groove disposed in the surface of the outer layer 122. The groove 14 is disposed to connect to the penetrating portion 13. The groove 14 is extended to the outside of the gripping site 1*a*. Therefore, one end of the groove 14 is connected to the penetrating portion 13 and the other end is located outside the gripping site 1*a*.

When the gripping stress is relaxed and the portion 121*a* of the inner layer 121 retracts in the penetrating portion 13, the groove 14 as described above ensures a flow chart allowing the penetrating portion 13 to communicate with the external fluid.

Figure 14:
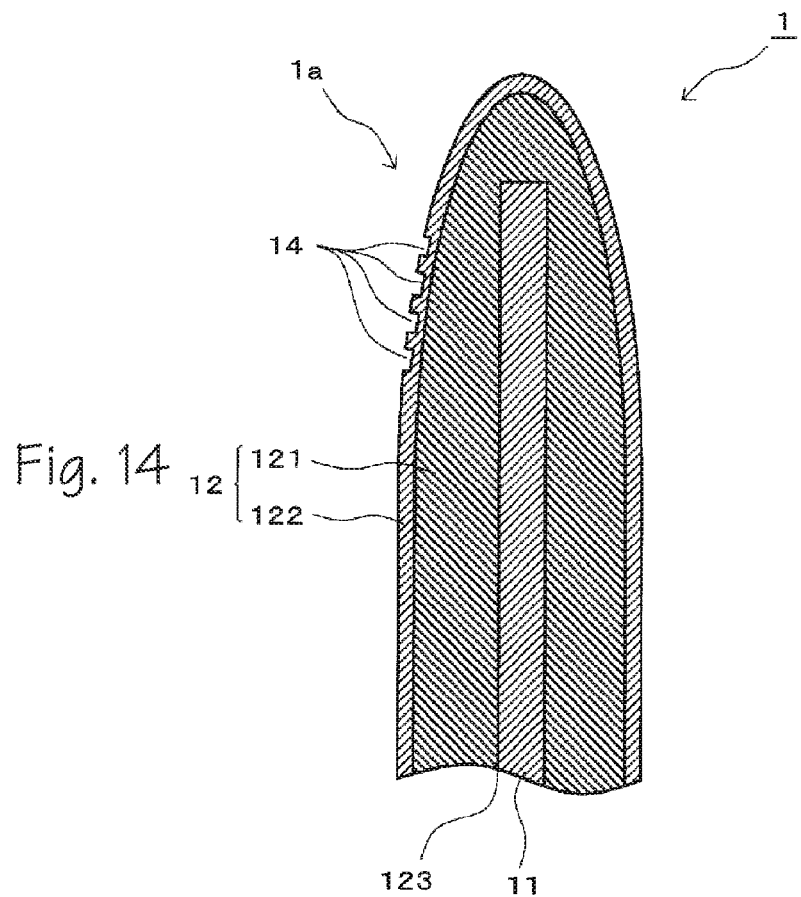
FIG. 14 is a cross-sectional view taken along a line (xiv)-(xiv) of FIG. 12.

As depicted in FIGS. 13 and 14, the penetrating portion 13 is formed to penetrate the outer layer 122 to the inner layer 121. On the other hand, the groove 14 is formed to a depth within a range not penetrating the outer layer 122. Therefore, the relationship of "the depth of the groove 14"<"the thickness of the outer layer 122" is satisfied. The groove 14 is disposed for the purpose of ensuring the flow channel guiding the external fluid into the penetrating portion 13 and therefore can achieve the purpose even without having the depth to the inner layer 121 as in the penetrating portion 13.

The shape of the groove 14 is not limited and may be not only a straight line shape as depicted but also a curved line shape. The shape is not limited to the line shapes and may be any geometric shape as long as the flow channel can be ensured. If both the penetrating portion 13 and the groove 14 are disposed into a linear shape, preferably, the line width of the penetrating portion 13 is the same as the line width of the groove 14 or the line width of the groove 14 is narrower. The number of the grooves 14 disposed for each of the penetrating portions 13 is not limited and the one or more grooves 14 can be disposed as needed.

The depth of the groove 14 may be constant or may not be constant. For example, the depth of the groove 14 may change such that the depth is deeper on the side connected to the penetrating portion 13 and made shallower at a position more distant from the penetrating portion 13.

Figure 15:
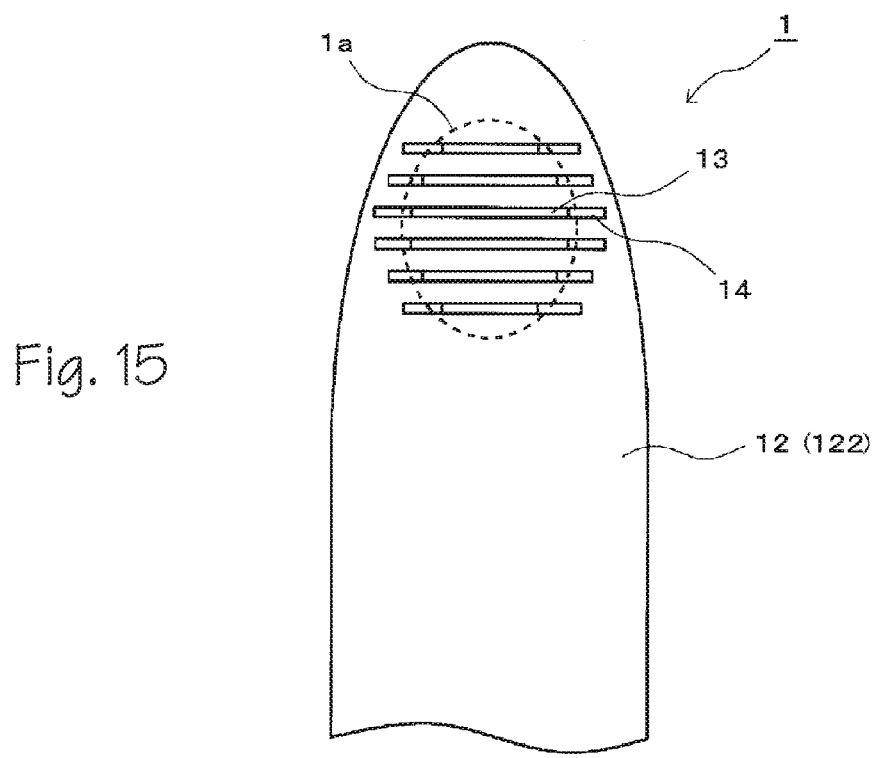
FIG. 15 is a front view of the robot gripping portion, depicting a further embodiment of a penetrating portion.

A plurality of the penetrating portions 13 formed into a slit shape is not limited to forming each of the penetrating portions 13 having the same formation width. As depicted in FIG. 15, a plurality of the slit-shaped penetrating portions 13 having formation widths different from each other may be disposed. Although the covering material 12 depicted in FIG. 15 represents a preferable example in which the inside of the penetrating portion 13 communicates with the external fluid when the gripping stress is relaxed, this is not a limitation. If the inside of the penetrating portion 13 is allowed to communicate with the external fluid when the gripping stress is relaxed, the penetrating portion 13 is not limited to those allowed to communicate through the groove 14 depicted in FIG. 15 and may be allowed to communicate with the external fluid though the extended portion 13*a*.

Figure 16:
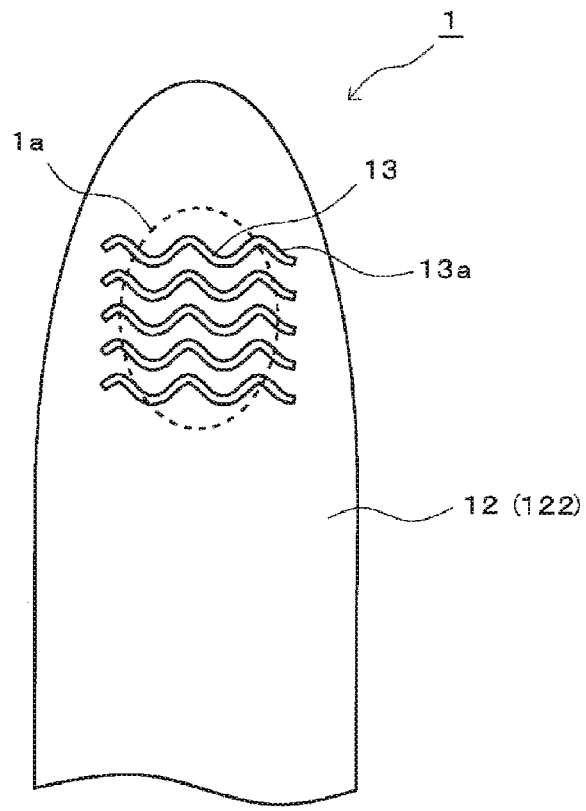
FIG. 16 is a front view of the robot gripping portion, depicting a further embodiment of the penetrating portion.

If the penetrating portions 13 is formed in to a slit shape, the penetrating portions 13 may have a straight line shape (a rectangular shape) or may be formed into a wave shape as depicted in FIG. 16. The number and the arrangement form of slits are not particularly limited. Although the covering material 12 depicted in FIG. 16 represents a preferable example in which the inside of the penetrating portion 13 communicates with the external fluid when the gripping stress is relaxed, this is not a limitation. If the inside of the penetrating portion 13 is allowed to communicate with the external fluid when the gripping stress is relaxed, the penetrating portion 13 is not limited to those allowed to communicate through the extended portion 13*a* depicted in FIG. 16 and may be allowed to communicate with the external fluid though the groove 14.

Figure 17:
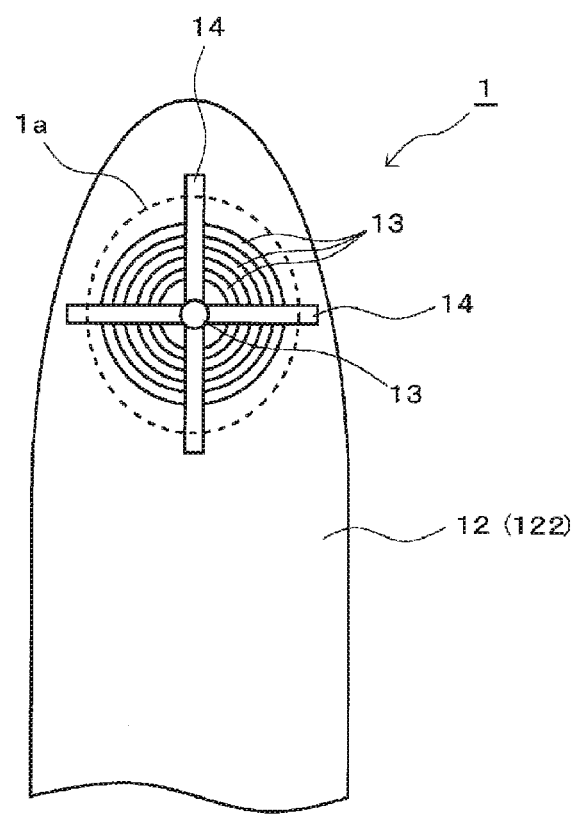
FIG. 17 is a front view of the robot gripping portion, depicting a further embodiment of the penetrating portion.

The penetrating portion 13 may be formed concentrically as depicted in FIG. 17. The concentric penetrating portion 13 may be formed into not only a circular shape but also an elliptic shape, a triangular shape, a rectangular shape, and other polygonal shapes. Although the covering material 12 depicted in FIG. 17 represents a preferable example in which the inside of the penetrating portion 13 communicates with the external fluid when the gripping stress is relaxed, this is not a limitation. If the inside of the penetrating portion 13 is allowed to communicate with the external fluid when the gripping stress is relaxed, the penetrating portion 13 is not limited to those allowed to communicate through the groove 14 depicted in FIG. 17 and may be allowed to communicate with the external fluid though the extended portion 13a. Although a plurality of the radially disposed grooves 14 (four grooves in the depicted example) is exemplarily illustrated in FIG. 17, no particular limitation is imposed.

Figure 18:
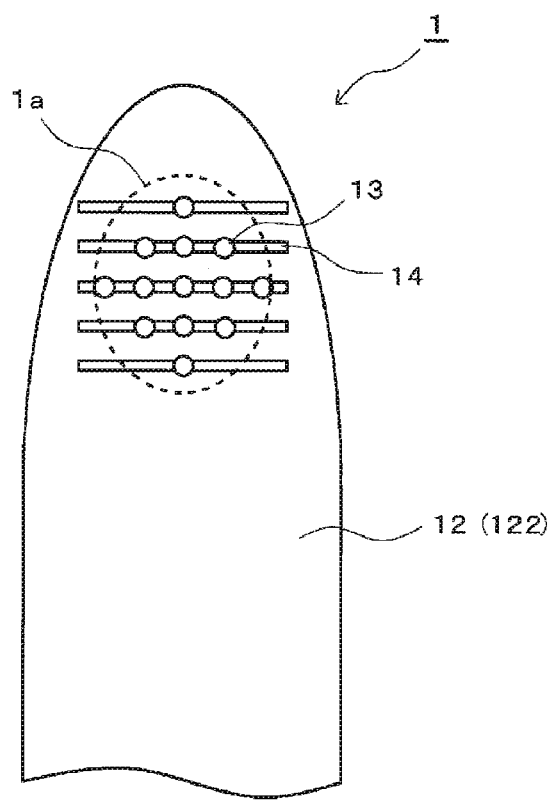
FIG. 18 is a front view of the robot gripping portion, depicting a further embodiment of the penetrating portion.
Figure 19:
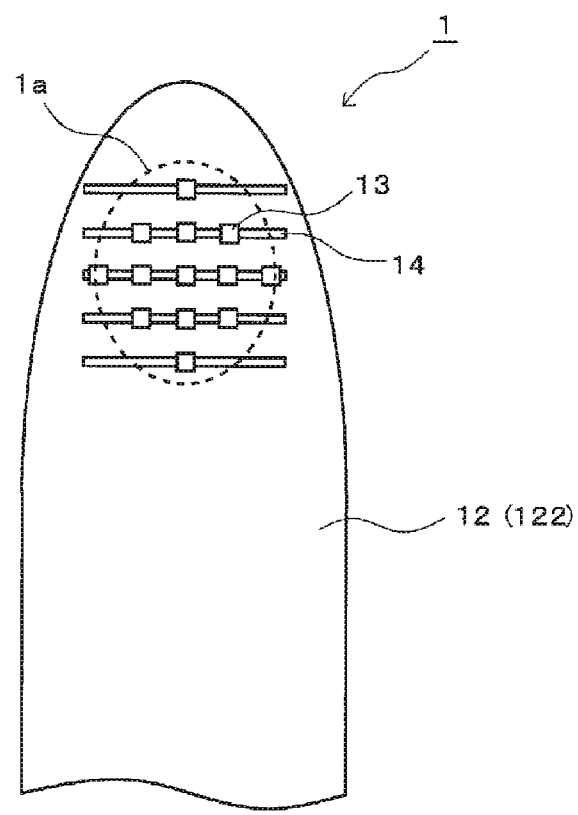
FIG. 19 is a front view of the robot gripping portion, depicting a further embodiment of the penetrating portion.

The opening shape of the penetrating portion 13 is not particularly limited and can be a hole shape as depicted in FIGS. 18 and 19. FIG. 18 depicts an example of the penetrating portion 13 formed into a circular hole shape and FIG. 19 depicts an example of the penetrating portion 13 formed into a rectangular hole shape. Although not depicted, the shape can be a triangular shape and other polygonal shapes. Although a plurality of the penetrating portions 13 depicted in the figures are vertically and horizontally arranged, the number of the penetrating portions 13 is not particularly limited and the one or more penetrating portions 13 may be formed in the outer layer 122. The arrangement configuration of the penetrating portions 13 is not particularly limited.

Although the covering materials depicted in FIGS. 18 and 19 represent preferable examples in which the inside of the penetrating portion 13 communicates with the external fluid when the gripping stress is relaxed, this is not a limitation. If the inside of the penetrating portion 13 is allowed to communicate with the external fluid when the gripping stress is relaxed, the penetrating portion 13 is not limited to those allowed to communicate through the groove 14 depicted in FIGS. 18 and 19 and may be allowed to communicate with the external fluid though the extended portion 13a.

In the present invention, the elastic body making up the inner layer 121 of the covering material 12 must have softness to the extent that the elastic body can enter the penetrating portions 13 of the outer layer 122 at the time of gripping of a heavy object requiring tackiness. A specific hardness of the elastic body making up the inner layer 121 is determined in accordance with conditions such as a weight of an object assumed to be gripped and a magnitude of a gripping stress applied at the time of gripping of the object, the hardness is preferably Shore A hardness of 0 to 40 degrees and more preferably Shore A hardness of 0 to 20 degrees in terms of effectively solving the problems of the present invention.

To enable proper gripping of an object that is a light object while the stress at the time of gripping of the object can efficiently be transmitted to the inner layer 121, the elastic body used for the outer layer 122 of the covering material 12 preferably has Shore A hardness of 40 to 90 degrees on condition that the hardness is higher than the inner layer 121. The hardness of the layers can be adjusted by changing a resin material or changing a mixture ratio between a main agent and a hardening agent.

The materials of the elastic bodies making up the inner layer 121 and the outer layer 122 are soft rubber and resin materials in general, for example, rubber, silicone, urethane, and gel and can be selected as needed depending on the weight, shape, property, etc. of the object assumed to be gripped. By way of example, the elastic body making up the inner layer 121 can be silicone gel or urethane gel. The elastic body making up the outer layer 122 can be silicone rubber or urethane rubber.

The inner layer 121 and the outer layer 122 may be made of materials of the same type or may be made of materials of different types as long as the materials are different in tackiness and hardness. However, the inner layer 121 and the outer layer 122 are preferably made of materials of the same type because high tackiness can be given between the layers.

An example of dimensions of the robot gripping portion 1 will be described with reference to FIG. 20. It is noted that (a), (b), and (c) are a front view, a side view, and a cross-sectional view, respectively, of the robot gripping portion 1.

The thickness of the layers of the covering material 12 will be described. A thickness T2 of the outer layer 122 is preferably set sufficiently smaller than a thickness T1 of the inner layer 121 because this facilitates the effect of the elasticity of the inner layer 121 on the object and facilitates the entry of the portion 121a of the inner layer 121 into the penetrating portion 13 of the outer layer 122 or the protrusion of the portion 121a of the inner layer 121 from the penetrating portion 13.

The thickness T2 of the outer layer 122 is preferably set to ¼ or less of the thickness T1 of the inner layer 121. This is because, since the elastic body of the inner layer 121 having relatively low hardness and high flexibility becomes thicker than the elastic body of the outer layer 122, the effect of the elasticity of the inner layer 121 on the object can further be facilitated.

A thickness T3 of the entire covering material 12 is, for example, 2 to 60 mm, preferably 4 to 10 mm. The respective thicknesses T1, T2 of the layers 121, 122 are preferably set within this range as needed. For example, the thickness T2 of the outer layer 122 can preferably be set within a range of 0.2 to 2.0 mm, more preferably 0.3 to 1.0 mm. The thickness T1 of the inner layer 121 can preferably be set within a range of 0.5 to 50.0 mm, more preferably 2.0 to 20.0 mm.

The outer shape and the outer shape dimensions of the robot gripping portion 1 are not particularly limited. For example, in the case of a finger shape as depicted in FIG. 20, the outer shape dimensions, for example, a width W1, a height H1, a thickness W2, etc. are not particularly limited. The width W1 is a width when the robot gripping portion 1 is viewed from the object to be gripped.

The size of the penetrating portion 13 disposed in the outer layer 122 can be selected as needed depending on the weight, shape, property, etc. of the object to be gripped and is not particularly limited. By way of example, the size may be 1 mm to 5 mm. If the penetrating portions 13 are disposed into a slit shape as depicted in FIG. 20, no particular limitation is imposed on a width P1 of the penetrating portion 13, an interval P2 between the adjacent penetrating portions 13, 13 when a plurality of the penetrating portions 13 is arranged in parallel, etc.

The shape and dimensions of the base material 11 are not particularly limited. For example, as depicted in FIG. 20, if the base material 11 is made up of a columnar core material, no particular limitation is imposed on a diameter (ø) C and a length H2 of the base material 11.

Figure 20:
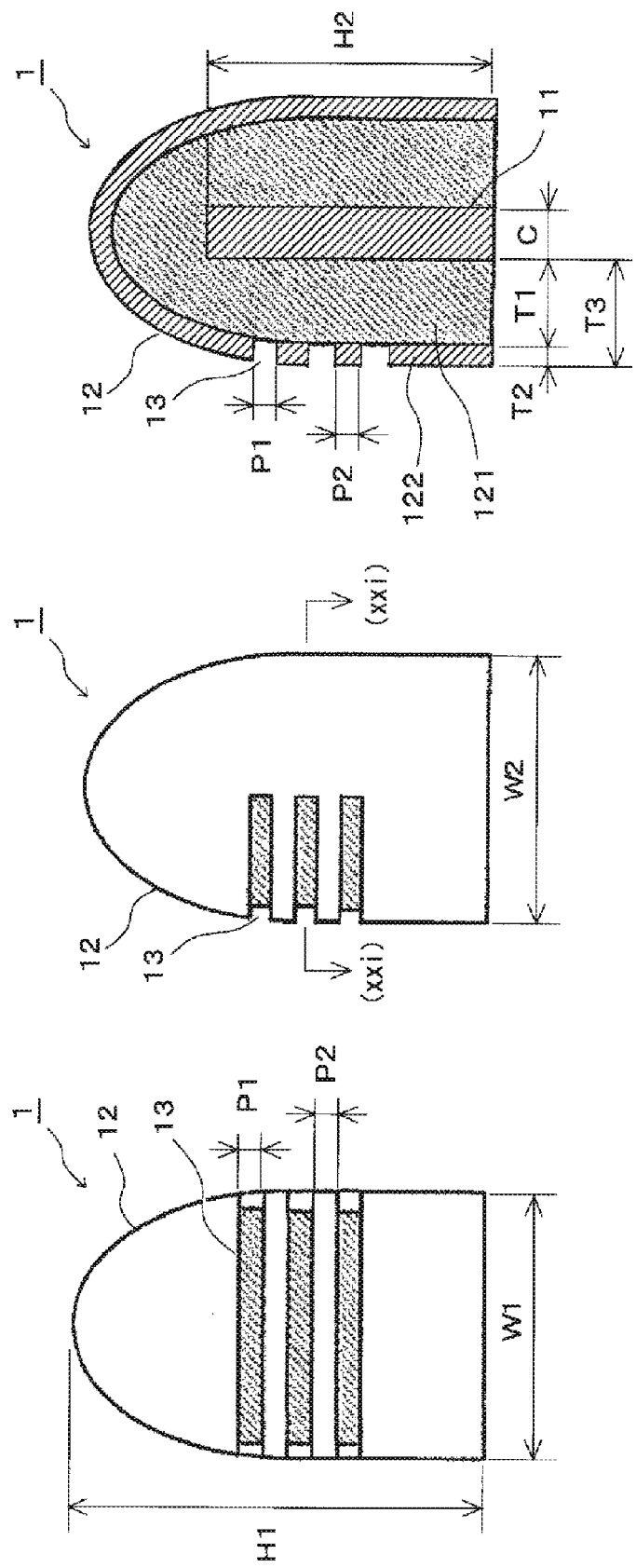
FIG. 20 is an explanatory view for explaining an example of the shape and dimensions of the robot gripping portion.
Figure 21:
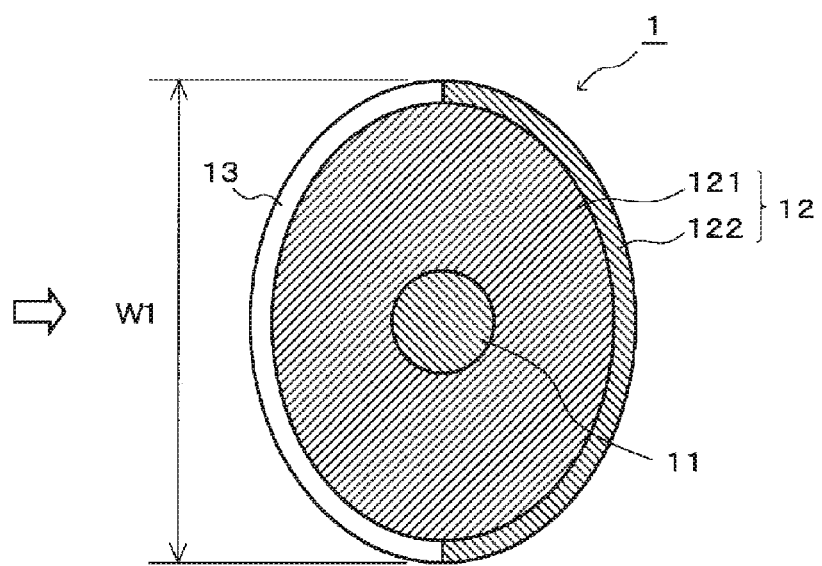
FIG. 21 is a cross-sectional view taken along a line (xxi)-(xxi) of FIG. 20.

FIG. 21 is a cross-sectional view of the finger-shaped robot gripping portion exemplarily illustrated in FIG. 20(b) taken along a line (xxi)-(xxi). In this example, although the apparent length of the penetrating portion 13 viewed from the object to be gripped (the projected length on a plane orthogonal to the direction of an arrow in FIG. 21) is equal to the width W1 of the robot gripping portion 1, this is not a limitation.

In the present invention, the inner layer 121 or both the inner layer 121 and the outer layer 122 of the covering material 12 may contain an antibacterial agent.

The antibacterial agent refers to those exhibiting a wide range of microbiological control functions from the suppression of occurrence and growth to the extinction of microorganisms through any one or a combination of two or more of pasteurization, sterilization, antisepsis, bacteria elimination, bacteria control, bacteriostasis, corrosion prevention, mildew prevention, bacteria prevention, etc.

The antibacterial agent imparting antibacterial properties may be inorganic, organic, or natural.

For example, for inorganic antibacterial agents, silver, copper, zinc, etc. are used as metals not harmful to human bodies and animals and having a sterilization function and a growth inhibiting function to microorganisms.

Among the inorganic antibacterial agents, a silver-based agent is preferably used as an antibacterial metal in terms of safety and functionality. The silver-based antibacterial agent can be used alone or can be used while being supported by supports including silicate-based carriers such as zeolite (crystalline aluminosilicate), silica gel, and clay mineral, phosphate-based carriers such as zirconium phosphate and calcium phosphate, soluble glass, and activated carbon. These supports may be granule or powdery.

A method of allowing the supports to support the antibacterial metal may be, for example, a method including immersing zeolite in an aqueous solution of antibacterial metal ions under a predetermined pH condition at a predetermined temperature for a predetermined time to replace some or all of the ion-exchangable ions in zeolite with the antibacterial metal ions followed by water washing and heating drying after completion of the ion exchange.

A technique of blending a metal-based antibacterial agent into the inner layer 121 and the outer layer 122 is not particularly limited. For example, a kneading technique may preferably be exemplified.

It is considered that the antibacterial activity of the silver-based antibacterial agent is attributable to surface oxidation and metal ions eluted into solution. It is considered that, in the antibacterial mechanism, (1) silver ions (Ag+) are taken in bacteria to cause inhibition of enzymes in cells or (2) the catalytic action of ions changes oxygen in the air or oxygen dissolved in water into active oxygen to allow the generated active oxygen to exhibit antibacterial properties.

The organic antibacterial agents include benzimidazole-based organic antibacterial agents etc. The natural antibacterial agents are acquired by using plants such as wasabi, ginger, bamboo leaves, and hinoki leaves or plant extracts such as hinokitiol and hiba oil.

An amount of the antibacterial agent can be changed as needed depending on the intended use of the covering material. If the antibacterial agent is contained in the inner layer 121 and is diffusively migrate to the outer layer 122, it is preferable to blend the antibacterial agent into the inner layer 121 as much as possible within a range available in terms of layer formation.

To delay the diffusive migration of the antibacterial agent from the inner layer 121 to the outer layer 122, the antibacterial agent may be contained in the outer layer 122 in advance in addition to the inner layer 121.

Since a material such as rubber and gel results in a smaller crosslinking density in a softer elastic body, the covering material 12 has a high degree of freedom of migration of an antibacterial agent component (a high rate of decrease in concentration). However, since the outer layer 122 hardly causing the diffusion of the antibacterial agent component is disposed on the gripping side, even if the antibacterial agent component diffuses from the inner layer 121 toward the outer layer 122, the diffusion of the antibacterial agent component toward the gripping side (gripped object) can be reduced. By forming the layers in two-layer configuration with different crosslinking densities, cleanliness can be retained for a long period.

The covering material 12 may further contain any proper additives depending on the purpose.

The additives include, for example, a photopolymerization initiator, a silane coupling agent, a dispersing agent, a curing agent, a curing accelerator, a diluting agent, an age resister, a denaturating agent, a surfactant, a dye, a pigment, a discoloration inhibitor, an ultraviolet absorber, a softening agent, a stabilizer, a plasticizer, and an antifoaming agent.

A method of manufacturing the covering material 12 can be implemented by employing a known method of manufacturing a gel sheet as needed, for example, cast molding, injection molding, compression molding, and centrifugal molding. The molding temperature is typically from room temperature to 100° C.

The inner layer 121 and the outer layer 122 may be manufactured in respective separate steps followed by lamination of the both layers or may be laminated by applying the material to be formed into the outer layer 122 onto one surface of the inner layer 121. In the order of formation in the case of integral molding, either the inner layer 121 or the outer layer 122 may first be molded or the both layers may be molded at the same time. The bonding between the layers is achieved by the adhesive properties of the materials.

Although the covering material 12 described above is exemplified as a two-layer structure made up only of the inner layer 121 and the outer layer 122, the covering material 12 of the present invention does not preclude the disposition of one or more other layers on the inner side than the inner layer 121, i.e., between the inner layer 121 and the base material 11.

The robot gripping portion 1 of the present invention is not limited to those formed into a finger shape as depicted and the outer shape thereof may arbitrarily be set depending on the purpose.

EXAMPLES

Although examples of the present invention will hereinafter be described, the present invention is not limited by the examples.

Example 1

A robot gripping portion was given an outer shape formed into a finger shape as depicted in FIGS. 1 and 2 and the outer shape dimensions thereof were set to a width (W1) of 20 mm×a height (H1) of 30 mm×a thickness (W2) of 15 mm. A casting mold of an inner layer of a covering material was fabricated with dimensions acquired by subtracting 0.5 mm (corresponding to a thickness T2 of an outer layer) from the outer shape dimensions. To form a mounting portion for insertion of a base material acting as a core material of the robot gripping portion, this casting mold was disposed with a cavity having an inner diameter Å of 7 mm (corresponding to a diameter C of the core material) and a length (corresponding to a length H2 of the core material) of 20 mm at the center of the bottom surface.

A casting mold of the outer layer of the covering material was fabricated with the dimensions same as the outer shape dimensions of the robot gripping portion. On a surface corresponding to the gripping site inside the casting mold of the outer layer, a total of 13 circular convex portions having a diameter of 2 mm and a height of 0.5 mm were formed at vertical and horizontal intervals of 1.8 mm in the same arrangement form as FIG. 1. These convex portions are potions just contacting the material of the inner layer when the material of the inner layer was set and preventing the flowing of the material of the outer layer to form spaces, i.e., the penetrating portions, penetrating the outer layer.

A urethane gel material having Shore A hardness of 0 degrees was injected into the casting mold of the inner layer and solidified to mold the inner layer of the covering material.

Subsequently, this inner layer was taken out from the casting mold and set to the casting mold of the outer layer and a urethane gel material having Shore A hardness of 50 degrees was injected into the casting mold of the outer layer and solidified to laminate the outer layer on the outside of the inner layer.

After the molding, the layers were taken out to acquire the covering material made up of a two-layer structure of the inner layer and the outer layer on the surface of the base material. The acquired covering material had the 13 penetrating portions in the site acting as the gripping site of the outer layer.

The base material acting as a core material was inserted into the covering material and bonded by an adhesive to construct a robot gripping portion. The two same robot gripping portions were fabricated.

When the two robot gripping portions were mounted on a robot hand to pinch a 0.7 kg M3 bolt as a light object with a predetermined gripping force, the bolt could be picked up without any problem. Since a portion of the inner layer was not protruded from the penetrating portions, the tackiness of the inner layer did not act on the bolt and the bolt could easily be released without sticking to the gripping site when the bolt was released.

On the other hand, when a 5 kg oil can was pinched and lifted as a heavy object with a predetermined gripping force corresponding to the weight thereof, the deformation of the outer layer of the gripping site was confirmed and the oil can could be lifted without a slip.

The oil can was easily released at the time of release and it was confirmed that the gripping site tacking the oil can was separated while being peeled off. This means that when the oil can was pinched and lifted and the gripping portion was deformed, a portion of the inner layer having the tackiness higher than the outer layer protruded through the penetrating portions and came into direct contact with the oil can to tack the oil can.

As described above, the same robot gripping portions could properly lift both the bolt used as a light object and the oil can used as a heavy object without change of the covering material, addition of a jig, etc.

Comparison Example 1

Two robot gripping portions having no penetrating portion in the covering material were fabricated in the same way as Example 1 except that no convex portion was disposed when the casting mold of the outer layer of the covering material was molded, and were mounted on a robot hand to pinch and lift each of the bolt and the oil can same as Example 1 with the predetermined gripping forces same as Example 1.

As a result, the bolt could be picked up without problem and when the bolt is released, the bolt could easily be released without sticking to the gripping site.

However, when the oil can is lifted, the oil can slipped between the paired robot gripping portions, resulting in an unstable gripping state of the oil can, and dropped off during the lifting operation.

Comparison Example 2

A casting mold of the covering material was fabricated with the same dimensions as the outer shape of the same robot gripping portion as Example 1. To form a mounting portion for insertion of a base material acting as a core material of the robot gripping portion, this casting mold was disposed with a cavity having an inner diameter ø of 7 mm and a length of 20 mm at the center of the bottom surface.

A urethane gel material having Shore A hardness of 10 degrees was injected into this casting mold and solidified to mold the covering material consisting of only one layer.

After the molding, a robot gripping portion was constructed by taking out the covering material and inserting the base material acting as a core material into the covering material and the two robot gripping portions were fabricated in the same way.

The robot gripping portions were mounted on a robot hand to pinch and lift each of the bolt and the oil can same as Example 1 with the predetermined gripping forces same as Example 1.

As a result, both the bolt and the oil can could be picked up without any problem. However, when the bottle was released, the bottle stuck to the surface of the gripping site and did not easily come off from the robot gripping portion and therefore had to be peeled off by human hands.

Example 2

Two robot gripping portions were formed in the same way as Example 1 except that a total of three rectangular convex portions having a width of 2 mm (corresponding to the width P1 of the penetrating portion) and a height of 0.5 mm (corresponding to the thickness T2 of the outer layer) were formed in the casting mold of the outer layer of the covering material on a surface corresponding to the gripping site on the inside at vertical intervals P2 of 1.8 mm in the arrangement form depicted in FIG. 20. These convex portions are potions just contacting the material of the inner layer when the material of the inner layer was set and preventing the flowing of the material of the outer layer to form spaces, i.e., the penetrating portions, penetrating the outer layer. The penetrating portions formed by these convex portions extended to the outside of the gripping site gripping the object to be gripped and had an extended portion outside the gripping site.

When the two robot gripping portions were mounted on a robot hand to pinch a metal ball having ø 76.2 mm as a light object with a predetermined gripping force, the ball could be picked up without problem. Since a portion of the inner layer was not protruded from the penetrating portions, the tackiness of the inner layer did not act on the bolt and the metal ball could easily be released without sticking to the gripping site when the metal ball was released.

On the other hand, when a 5 kg oil can was pinched and lifted as a heavy object with a predetermined gripping force corresponding to the weight thereof, the deformation of the outer layer of the gripping site was confirmed and the oil can could be lifted without a slip.

When the oil can was released, it was confirmed that the gripping site tacking the oil can is separated while being peeled off. This means that when the oil can was pinched and lifted and the gripping portion is deformed, a portion of the inner layer having the tackiness higher than the outer layer protruded through the penetrating portions and came into direct contact with the oil can to tack the oil can.

As described above, the same robot gripping portions could properly lift both the bolt used a light object and the oil can used a heavy object without change of the covering material, addition of a jig, etc.

Moreover, since the inside of the penetrating portions communicated with external fluid to prevent the reduction in pressure in the penetrating portions when the gripping stress was relaxed and the portion of the inner layer retracted in the penetrating portions, both the metal ball used as a light object and the oil can used as a heavy object could easily be released as compared to Example 1.

EXPLANATIONS OF LETTERS OR NUMERALS

1: robot gripping portion
1a: gripping site
11: base material
12: covering material
121: inner layer
121a: portion of inner layer
122: outer layer
123: mounting portion
13: penetrating portion
13a: extended portion
14: groove
X1: object that is a light object
X2: object that is a heavy object
F1, F2: gripping stress
α: flow channel While the preferred embodiments of the devices and methods have been described in reference to the environment in which they were developed, they are merely illustrative of the principles of the inventions. The elements of the various embodiments may be incorporated into each of the other species to obtain the benefits of those elements in combination with such other species, and the various beneficial features may be employed in embodiments alone or in combination with each other. Other embodiments and configurations may be devised without departing from the spirit of the inventions and the scope of the appended claims.

We claim:

1. A covering material disposed on a surface of a base material having a function of gripping an object, comprising:
   an inner layer made up of an elastic body; and an outer layer on a surface of the inner layer, made up of an elastic body coming into contact with the object when gripping the object,
   the inner layer being made up of the elastic body having a tackiness and having a hardness lower than the outer layer,
   the outer layer having one or more penetrating portions penetrating to the inner layer such that when a stress acts at the time of gripping of the object, a portion of the inner layer enters the penetrating portion or protrudes from the penetrating portion depending on a magnitude of the stress.

2. The covering material of claim 1, wherein the outer layer is configured such that when the stress is relaxed and the portion of the inner layer retracts in the penetrating portion, the inside of the penetrating portion communicates with external fluid to prevent pressure from being reduced in the penetrating portion.

3. The covering material of claim 2, wherein in the surface of the outer layer, the penetrating portion extends to the outside of a gripping site gripping the object so that the penetrating portion itself forms a flow channel allowing the inside of the penetrating portion to communicate with the external fluid.

4. The covering material of claim 2 wherein the surface of the outer layer is disposed with a groove connecting to the penetrating portion and having a depth within a range not reaching the inner layer, and wherein the groove extends to the outside of the gripping site gripping the object so that the groove forms a flow channel allowing the inside of the penetrating portion to communicate with the external fluid.

5. The covering material of claim 1 wherein the hardness of the elastic body of the inner layer is Shore A hardness of 0 to 40 degrees, and wherein the hardness of the elastic body of the outer layer is Shore A hardness of 40 to 90 degrees.

6. The covering material of claim 1 wherein the elastic body used for the inner layer is a silicone gel or a urethane gel, and wherein the elastic body used for the outer layer is a silicone rubber or a urethane rubber.

7. A covering structure of a robot gripping portion comprising on a surface of the robot gripping portion having a function of gripping an object:
   an inner layer made up of an elastic body; and an outer layer on a surface of the inner layer, made up of an elastic body coming into contact with the object when gripping the object,
   the inner layer being made up of the elastic body having a tackiness and having a hardness lower than the outer layer,
   the outer layer having one or more penetrating portions penetrating to the inner layer such that when a stress acts at the time of gripping of the object, a portion of the inner layer enters the penetrating portion or protrudes from the penetrating portion depending on a magnitude of the stress.

8. The covering structure of a robot gripping portion of claim 7, wherein the outer layer is configured such that when the stress is relaxed and the portion of the inner layer retracts in the penetrating portion, the inside of the penetrating portion communicates with external fluid to prevent pressure from being reduced in the penetrating portion.

9. The covering structure of a robot gripping portion of claim 8, wherein in the surface of the outer layer, the penetrating portion extends to the outside of a gripping site gripping the object so that the penetrating portion itself forms a flow channel allowing the inside of the penetrating portion to communicate with the external fluid.

10. The covering structure of a robot gripping portion of claim 8 wherein the surface of the outer layer is disposed with a groove connecting to the penetrating portion and having a depth within a range not reaching the inner layer, and wherein the groove extends to the outside of the gripping site gripping the object so that the groove forms a flow channel allowing the inside of the penetrating portion to communicate with the external fluid.

11. The covering structure of a robot gripping portion of claim 7 wherein the hardness of the elastic body of the inner layer is Shore A hardness of 0 to 40 degrees, and wherein the hardness of the elastic body of the outer layer is Shore A hardness of 40 to 90 degrees.

12. The covering structure of a robot gripping portion of claim 7 wherein the elastic body used for the inner layer is a silicone gel or a urethane gel, and wherein the elastic body used for the outer layer is a silicone rubber or a urethane rubber.

* * * * *